United States Patent
Polidore et al.

(10) Patent No.: US 12,384,103 B2
(45) Date of Patent: Aug. 12, 2025

(54) METHOD FOR THE MANUFACTURE OF A SPATIALLY VARYING DIELECTRIC MATERIAL, ARTICLES MADE BY THE METHOD, AND USES THEREOF

(71) Applicant: ROGERS CORPORATION, Chandler, AZ (US)

(72) Inventors: Trevor Polidore, Scottsdale, AZ (US); Sergio Clavijo, Phoenix, AZ (US); Dirk Baars, Phoenix, AZ (US)

(73) Assignee: ROGERS CORPORATION, Chandler, AZ (US)

( * ) Notice: Subject to any disclaimer, the term of this patent is extended or adjusted under 35 U.S.C. 154(b) by 179 days.

(21) Appl. No.: 18/127,745

(22) Filed: Mar. 29, 2023

(65) Prior Publication Data

US 2023/0226751 A1    Jul. 20, 2023

Related U.S. Application Data

(60) Continuation of application No. 17/855,999, filed on Jul. 1, 2022, which is a division of application No.
(Continued)

(51) Int. Cl.
*B29C 64/124* (2017.01)
*B29L 31/34* (2006.01)
(Continued)

(52) U.S. Cl.
CPC ......... *B29C 64/124* (2017.08); *B29L 2031/34* (2013.01); *B33Y 10/00* (2014.12);
(Continued)

(58) Field of Classification Search
CPC .... B29C 64/124; H01Q 15/08; H01Q 9/0485; B33Y 30/00; B33Y 70/10; B33Y 10/00;
(Continued)

(56) References Cited

U.S. PATENT DOCUMENTS

| | | | |
|---|---|---|---|
| 4,458,249 A | 7/1984 | Valentino et al. | |
| 4,929,402 A | 5/1990 | Hull | |

(Continued)

FOREIGN PATENT DOCUMENTS

| | | |
|---|---|---|
| CN | 1512920 A | 7/2004 |
| CN | 101809500 A | 8/2010 |

(Continued)

OTHER PUBLICATIONS

"New 3D Printed Electromagnetic Lense from OmniPreSense"; URL: http://www.microwavejournal.com/articles/31133-new-3d-printed-electromagnetic-lens-from-omnipresense; Date of Access: Oct. 16, 2018; 8 pages.

(Continued)

*Primary Examiner* — Christina A Johnson
*Assistant Examiner* — Kelsey C Grace
(74) *Attorney, Agent, or Firm* — CANTOR COLBURN LLP

(57) ABSTRACT

A stereolithography method of manufacture of a polymer structure having a spatially gradient dielectric constant, including: providing a volume of a liquid, radiation-curable composition; irradiating a portion of the liquid, radiation-curable composition with activating radiation in a pattern to form a layer of the polymer structure; contacting the layer with the liquid, radiation-curable composition; irradiating the liquid, radiation-curable composition with activating radiation in a pattern to form a second layer on the first layer; and repeating the contacting and irradiating to form the polymer structure, wherein the polymer structure comprises a plurality of unit cells wherein each unit cell is integrally connected with an adjacent unit cell, each unit cell is defined by a plurality of trusses formed by the irradiation, wherein the trusses are integrally connected with each other at their (Continued)

respective ends, and the trusses of each unit cell are dimensioned to provide the spatially gradient dielectric constant.

18 Claims, 6 Drawing Sheets

Related U.S. Application Data

16/657,054, filed on Oct. 18, 2019, now Pat. No. 11,407,169.

(60) Provisional application No. 62/747,497, filed on Oct. 18, 2018.

(51) Int. Cl.
| | |
|---|---|
| B33Y 10/00 | (2015.01) |
| B33Y 40/20 | (2020.01) |
| B33Y 70/10 | (2020.01) |
| B33Y 80/00 | (2015.01) |

(52) U.S. Cl.
CPC .............. *B33Y 40/20* (2020.01); *B33Y 70/10* (2020.01); *B33Y 80/00* (2014.12)

(58) Field of Classification Search
CPC ..... B33Y 80/00; B33Y 40/20; B29L 2031/34; B29L 2011/0016; G02B 2207/107
See application file for complete search history.

(56) References Cited

U.S. PATENT DOCUMENTS

| | | | |
|---|---|---|---|
| 5,104,592 A | 4/1992 | Hull et al. | |
| 5,184,307 A | 2/1993 | Hull et al. | |
| 5,192,559 A | 3/1993 | Hull et al. | |
| 5,234,636 A | 8/1993 | Hull et al. | |
| 5,236,637 A | 8/1993 | Hull | |
| 5,273,691 A | 12/1993 | Hull et al. | |
| 5,677,796 A | 10/1997 | Zimmerman et al. | |
| 5,807,519 A | 9/1998 | Suzuki et al. | |
| 5,828,271 A | 10/1998 | Stitzer | |
| 6,076,324 A * | 6/2000 | Daily .................. | E04B 1/19 |
| | | | 52/646 |
| 6,855,478 B2 | 2/2005 | DeVoe et al. | |
| 7,179,844 B2 * | 2/2007 | Aki .................. | C08J 9/0066 |
| | | | 343/911 L |
| 7,355,560 B2 | 4/2008 | Nagai | |
| 7,534,844 B2 | 5/2009 | Lee et al. | |
| 7,550,246 B2 | 6/2009 | Fukuzumi et al. | |
| 7,649,029 B2 | 1/2010 | Kolb et al. | |
| 7,767,728 B2 | 8/2010 | Lu et al. | |
| 8,119,214 B2 | 2/2012 | Schwantes et al. | |
| 8,193,973 B2 | 6/2012 | Morton et al. | |
| 8,232,043 B2 | 7/2012 | Williamson et al. | |
| 8,980,971 B2 | 3/2015 | Ueda et al. | |
| 9,205,601 B2 | 12/2015 | Desimone et al. | |
| 9,944,031 B2 | 4/2018 | Thompson et al. | |
| 10,355,367 B2 | 7/2019 | Henry et al. | |
| 11,574,849 B2 | 2/2023 | Gmundner et al. | |
| 2001/0025203 A1 | 9/2001 | Gervasi | |
| 2001/0043158 A1 | 11/2001 | Adachi et al. | |
| 2004/0170809 A1 | 9/2004 | Williams et al. | |
| 2005/0154567 A1 | 7/2005 | Jackman et al. | |
| 2005/0285115 A1 | 12/2005 | Nakagawa et al. | |
| 2006/0022379 A1 | 2/2006 | Wicker et al. | |
| 2007/0067058 A1 | 3/2007 | Miyamoto et al. | |
| 2008/0042903 A1 | 2/2008 | Cheng | |
| 2012/0003449 A1 | 1/2012 | Yializis et al. | |
| 2014/0043202 A1 | 2/2014 | Wong et al. | |
| 2015/0236428 A1 | 8/2015 | Caratelli et al. | |
| 2015/0346334 A1 | 12/2015 | Nagaishi et al. | |
| 2016/0036132 A1 | 2/2016 | Rumpf et al. | |
| 2016/0219976 A1 | 8/2016 | Guyan | |
| 2016/0263823 A1 * | 9/2016 | Espiau .................. | B33Y 70/00 |
| 2017/0110804 A1 | 4/2017 | Henry et al. | |
| 2017/0125908 A1 | 5/2017 | Pance et al. | |
| 2019/0115668 A1 | 4/2019 | Coward et al. | |
| 2020/0176876 A1 | 6/2020 | Pance et al. | |
| 2022/0181052 A1 | 6/2022 | Williams et al. | |
| 2022/0185936 A1 | 6/2022 | Abell et al. | |

FOREIGN PATENT DOCUMENTS

| | | |
|---|---|---|
| CN | 107111225 A | 8/2017 |
| CN | 107415235 A | 12/2017 |
| CN | 110380230 A | 10/2019 |
| CN | 216288983 U | 4/2022 |
| DE | 10057686 A1 | 6/2002 |
| JP | H10006346 | 1/1998 |
| JP | 2000209022 A | 7/2000 |
| JP | 2003344629 A | 12/2003 |
| JP | 2015138240 A | 7/2015 |
| TW | 201627689 A | 8/2016 |
| WO | 03100484 A2 | 12/2003 |
| WO | 2005002833 A1 | 1/2005 |
| WO | 2012129968 A1 | 10/2012 |
| WO | 2014100462 A1 | 6/2014 |
| WO | 2014126837 A2 | 8/2014 |
| WO | 2015102938 A1 | 7/2015 |
| WO | 2016153711 A1 | 9/2016 |
| WO | 2017040883 A1 | 3/2017 |
| WO | 2017075177 A1 | 5/2017 |
| WO | 2017075184 A1 | 5/2017 |
| WO | 2017075186 A1 | 5/2018 |

OTHER PUBLICATIONS

"Photoacid Generator Selection Guide for the electronics industry and energy curable coatings" (BASF 2010).
Abdulmajid, et al., "Higher Order Mode Layered Cylindrical Dielectric Resonator Antenna", Progress In Electromagnetics Research C., vol. 90, 2019 (13 pgs).
Abdulmajid, et al., "Higher-Order-Mode Circularly Polozrized Two-Layer Rectangular Dielectric Resonator Antenna" IEEE Antennas and Wireless Progagation Letters, vol. 17, No. 6, Jun. 2018 (4 pgs).
Bhattacharya, et al., "Broadbanding and multi-frequency in dielectric resonator antennas: a comprehensive review", International Journal of Microwave and Wireless Technologies, 2022 (pp. 1-17).
Buerkle, A. et al; "Fabrication of a DRA Array Using Ceramic Stereolithography"; IEEE Antennas and Wireless Popagation Letters; IEEE; vol. 5,, No. 1, Jan. 2007; pp. 479-481.
Guo, Yomg-Xin, et al.,; "Wide-Band Stacked Double Annular-Ring Dielectric Resonator Antenna at the End-Fire Mode Operation"; IEEE Transacions on Antennas and Propagation; vol. 53; No. 10; Oct. 2005; 3394-3397 pages.
International Preliminary Report On Patentability for International Application No. PCT/US2019/056971, International Filing Date Oct. 18, 2019, Date of Mailing Apr. 29, 2021, 18 pages.
International Search Report for International Application No. PCT/US2019/056971, International Filing Date Oct. 18, 2019, Date of Mailing Apr. 29, 2020, 10 pages.
Kakade, A.B., et al; "Analysis of the Rectangular Waveguide Slot Coupled Multilayer hemispherical Dielectric Resonator Antenna"; IET Microwaves, Antennas & Propagation, The Institution of Engineering and Technology; vol. 6; No. 3; Jul. 11, 2011; 338-347 pages.
Liang, M. et al.; "A 3-D Luneburg lens antenna fabricated by polymer jetting rapid prototyping," IEEE Transactions on Antennas and Propagation, 62(4), Apr. 2014, 1799-1807.
Nannini, et al., "A Dual-Frequency Dielectric Resonator Antenna" Microwave and Optical Technology Letters, vol. 38, No. 1, Jul. 5, 2003 (2 pgs).
Walsh, et al., "An Investigation of Stacked and Embedded Cylindrical Dielectric Resonator Antennas" IEEE Antennas and Wireless Propagation Letters, vol. 5, 2006 (4 pgs).
Written Opinion for International Application No. PCT/US2019/056971, International Filing Date Oct. 18, 2019, Date of Mailing Apr. 29, 2020, 19 pages.

(56) References Cited

OTHER PUBLICATIONS

Zhang Shiyu et al.; "3D-Printed Graded Index Lenses for RF Applications"; ISAP 2016 International Symposium on Antennas and Propagation, Okinawa, Japan.; pp. 1-27.

* cited by examiner

METHOD FOR THE MANUFACTURE OF A SPATIALLY VARYING DIELECTRIC MATERIAL, ARTICLES MADE BY THE METHOD, AND USES THEREOF

CROSS-REFERENCE TO RELATED APPLICATIONS

This application is a continuation of application of application Ser. No. 17/855,999, filed Jul. 1, 2022, which is divisional application of application Ser. No. 16/657,054, filed Oct. 18, 2019, now U.S. Pat. No. 11,407,169, which claims priority to and the benefit of U.S. Provisional Application 62/747,497 filed on Oct. 18, 2018, which are incorporated herein by reference in their entirety.

BACKGROUND

Disclosed herein is method for the manufacture of structures having a spatially varying dielectric constant by additive manufacturing, electronic devices made by the method, and uses of the electronic devices in electronic articles.

Numerous dielectric structures having a preselected dielectric constant have been described for use in electronic devices. Methods for the manufacture of structures having a spatially varying dielectric constant, such as a Luneburg lens, is a more difficult problem to solve. One method to approach manufacture of a structure such as a Luneburg lens is to spatially vary the density of a dielectric material, which gives rise to a corresponding spatial variance of dielectric constant. For example, U.S. Pat. No. 5,677,796 describes a Luneburg lens having a dielectric gradient formed by drilling a plurality of holes extending radially from the center of a sphere to control the resultant local density of the material, and thus the relative dielectric constant as a function of the distance from the center of the sphere. U.S. Pat. No. 7,179,844 describes three-dimensional expansion of three different composites to provide three different materials having a uniform, but different dielectric constant, and then layering the materials to provide a structure having a step gradient of the dielectric constants. These methods are slow, complex, and difficult to adapt to different shapes and different gradients.

Additive manufacturing (AM) (which includes 3-dimensional (3D) printing and solid freeform fabrication) allows the production of three-dimensional objects of virtually any shape from a digital model. Generally, this is achieved by creating a digital blueprint of a desired structure with computer-aided design (CAD) modeling software and then slicing that virtual blueprint into digital cross-sections. These cross-sections are formed or deposited in a sequential layering process to create the 3D structure. Liang et al. have described an additive manufacturing (AM) method to make structures having a step gradient of the dielectric constants. (Liang, M. et al., "A 3-D Luneburg lens antenna fabricated by polymer jetting rapid prototyping," IEEE Transactions on Antennas and Propagation, 62 (4), 1799-1807.) Liang et al. describe a polymer jetting process similar to an ink jetting process where thin layers of two different radiation curable compositions (one for the object and one for a support material) are jetted onto a stage and cured. The polymer jetting process allows the manufacture of small structures of a varying overall shape. However, the shape is limited in that no overhangs can be present unless a support material is simultaneously laid down and then removed. The process is further limited with respect to the types of polymers used, as the polymer must be jettable in very fine streams, while at the same time providing the desired mechanical and electrical characteristics upon cure.

There accordingly remains a need in the art for efficient, flexible methods for the manufacture of dielectric polymer structures that vary spatially in dielectric constant across the material.

BRIEF SUMMARY

Disclosed herein is a method for the manufacture of a polymer structure having a spatially gradient dielectric constant, the method comprising: providing a volume of a liquid, radiation-curable composition; irradiating a portion of the liquid, radiation-curable composition with activating radiation in a pattern to form a layer of the polymer structure; contacting the layer with the liquid, radiation-curable composition; irradiating the liquid, radiation-curable composition with activating radiation in a pattern to form a second layer on the first layer; and repeating the contacting and irradiating to form the polymer structure, wherein the polymer structure comprises a plurality of unit cells wherein each unit cell is integrally connected with an adjacent unit cell, each unit cell is defined by a plurality of trusses formed by the irradiation, wherein the trusses are integrally connected with each other at their respective ends, and the trusses of each unit cell are dimensioned to provide the spatially gradient dielectric constant.

The polymer structures made by the above method are also disclosed.

In another aspect, an electronic device comprises a polymer structure, wherein the polymer structure comprises: a unified body of a dielectric material comprising a plurality of unit cells, each unit cell comprising a plurality of trusses integrally connected with each other at their respective ends, wherein each unit cell is integrally connected with an adjacent one of the unit cells; and wherein the average dielectric constant of the unified body of the dielectric material varies from a first portion of the body to a second portion of the body.

Also described is an electronic device comprising the polymer structure, wherein the unified body of dielectric material forms at least part of an impedance-matching layer, a dielectric waveguide, a lens, a reflect array, an antenna matching structure, a superstrate, a coupler, a divider, or a dielectric antenna.

The above described and other features are exemplified by the following figures, detailed description, examples, and claims.

BRIEF DESCRIPTION OF THE DRAWINGS

The following Figures are exemplary aspects, which are provided to illustrate aspects of this disclosure.

DETAILED DESCRIPTION

Figure 1A:
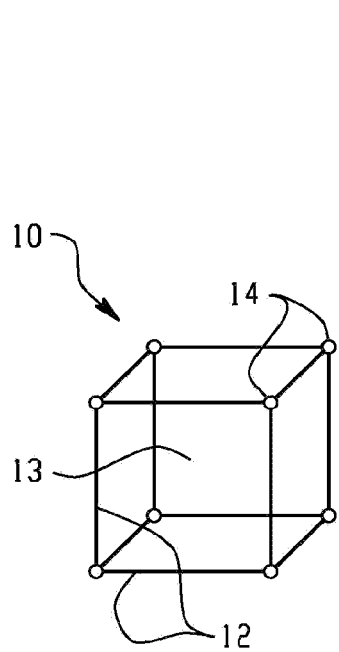
FIG. 1A is a schematic, perspective view of a cubic lattice unit cell of a polymer structure.

It has been discovered by the inventors hereof that polymer structures varying in dielectric constant across the polymer material can be efficiently obtained using stereolithography apparatus (SLA) additive manufacturing. In particular, SLA methods can be used to provide polymer structures having an open-lattice cell structure wherein the size of each lattice is varied to provide a corresponding change in dielectric constant. This method allows fast, efficient manufacture of structures having a preselected dielectric constant gradient in a variety of configurations and a variety of shapes. The method is also amenable to use of different polymers and polymer compositions. Polymer structures useful in 5G applications can be manufactured.

SLA is also referred to in the art as optical fabrication, photosolidification, and resin printing. Any of the foregoing methods can be used herein and are referred to collectively as "SLA" methods. In these methods, successive thin layers of a liquid resin are selectively photopolymerized using a light source, starting from the bottom layer to the top layer or starting from the top layer to the bottom layer. This process has been described, for example, in U.S. Pat. Nos. 4,575,330, 4,929,402, 5,104,592, 5,184,307, 5,192,559, 5,234,636, 5,236,637, and 5,273,691.

There are different approaches to SLA, including direct/laser writing and mask-based writing using digital projection. In direct/laser writing a stage on which the polymer material is formed is located just below a surface of a volume of a curable liquid resin composition for the formation of a polymer. A single light source (e.g., a laser) moves along the surface of the curable composition, row by row, until completely curing the desired layer. To initiate the following layer, the stage sinks lower into the volume of the curable liquid resin composition until a new layer of the curable composition covers the surface and the curing process repeats. In between layers, a blade loaded with the curable liquid resin composition levels the surface of the resin to ensure a uniform layer of liquid prior to another round of light exposure. This procedure repeats until the curable liquid resin composition is printed to form the 3D structure.

In mask-based writing using digital projection, the stage is submerged a defined distance into the volume of the liquid, curable composition. The volume is located in a bath having an optically clear bottom. Next, the light source is guided to the stage in a pattern to polymerize the curable composition between the light source and the stage. In the digital projection method, a digital mirror device allows an entire layer of a given pattern to be cured simultaneously. The stage can then be raised by a defined distance, and another layer can be cured. This procedure repeats until the curable liquid resin composition is printed to form the 3D structure.

The polymer structures formed by SLA are a unified body of dielectric material that comprises a plurality of unit cells. Each unit cell comprises a plurality of trusses integrally connected with each other at their respective ends. Each unit cell is integrally connected with an adjacent one of the unit cells. The average dielectric constant of the unified body of dielectric material varies from one portion of the body to another portion of the body. For example, the average dielectric constant of the unified body of dielectric material can vary from an inner portion of the body to an outer portion, or from one side of the body to another side.

Figure 1B:
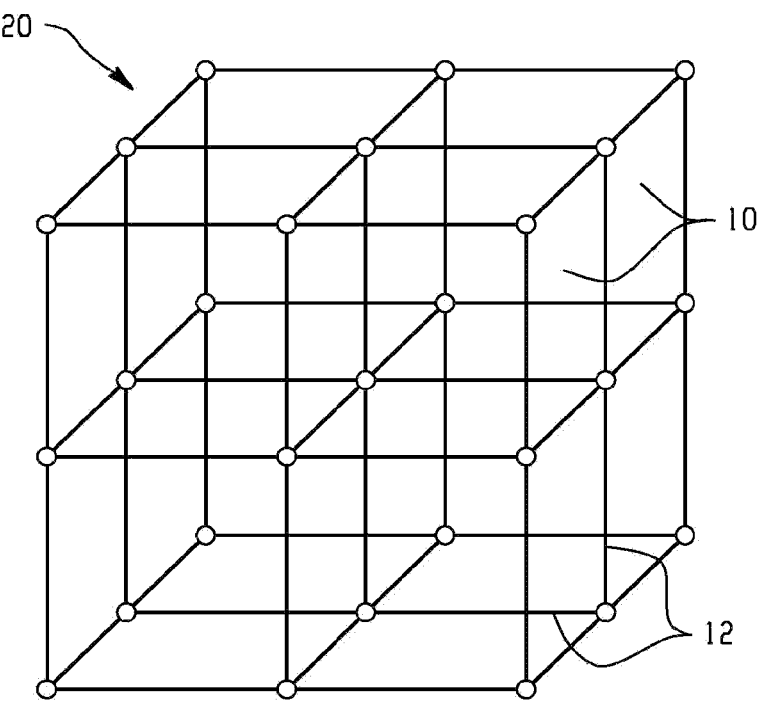
FIG. 1B is a schematic, perspective view of a polymer structure containing a plurality of cubic lattice unit cells as shown in FIG. 1A.
Figure 2A:
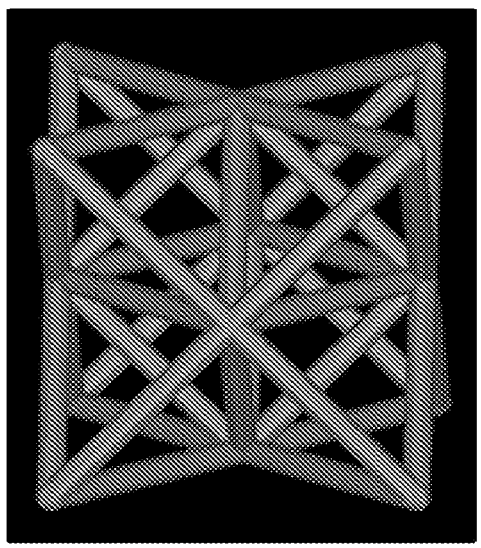
FIG. 2A is a schematic, perspective view of an octet lattice unit cell of a polymer structure

In particular, the unit cells comprise trusses that define interstitial spaces, as illustrated, for example, in FIG. 1A and FIG. 1B. FIG. 1A shows a cubic unit cell 10 comprising trusses 12 defining interstitial space 13. FIG. 2A shows an octet unit cell 20 comprising trusses and interstitial spaces defined by the trusses. As used herein, the term "truss" means a structural member of a framework of the members, where each truss member is connected to another adjacent truss member only at its respective ends 14, as indicated by the spheres 14, to form joints between truss ends. Any load distributed through each truss member is assumed to be distributed through the corresponding joints 14. It is to be understood that the spheres shown at joints 14 are only for illustration of the joints and may or may not be present in the polymer lattice structures. In an aspect, no additional material is present at the joints of the polymer lattice structures except the material contributed by each truss forming the joint.

Figure 3A:
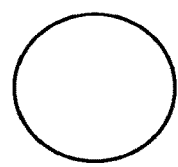
FIG. 3A to FIG. 3F are schematic cross-sectional views of trusses of exemplary embodiments.
Figure 3B:
Figure 3C:
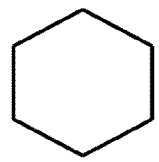
Figure 3D:
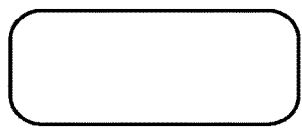
Figure 3E:
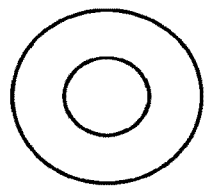
Figure 3F:
Figure 4A:
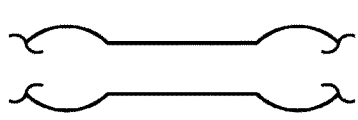
FIG. 4A to FIG. 4D are schematic side views of trusses of exemplary embodiments.
Figure 4B:
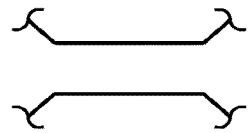
Figure 4C:
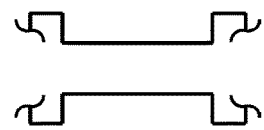
Figure 4D:

Each truss 12 can be straight or curved. In an aspect, each truss is substantially straight. Each truss can have a cross-section that is irregular or substantially regular. For example, with reference to FIGS. 3B-3F, the cross-section can be circular (FIG. 3A), elliptical (FIG. 3B), polygonal, e.g., hexagonal (FIG. 3C) or rectangular (3D), ring (FIG. 3E), ovoid (FIG. 3F), or the like. In an aspect, each truss is of the same cross section throughout the length of the truss, such as circular or square. Alternatively, it is possible to vary the cross-section of each truss, for example having a truss that is substantially circular at each end, but substantially square in the portion between each end. Each truss within a unit cell can further have the same cross-sectional diameter, or a varying diameter. For example, while each truss 12 in FIG. 2A is shown as having a substantially uniform diameter throughout its length, with reference to FIGS. 4A-4D, each truss could have a diameter that varies along its length, for example a dog bone shape (FIG. 4A) having a larger circular diameter at each end thereof, or a pyramidal (FIG. 4B) or a polygonal shape (4C) of larger diameter at each end thereof. In some aspects, particularly where a continuous gradient is desired as described in more detail below, the truss can have a continuously varying diameter from one end to the other end, i.e., from smaller to larger (FIG. 4D) where $H_1$ is less than $H_2$.

Each truss can have a diameter in the range of 0.03 to 5.0 millimeters (mm), preferably 0.05 to 4.0 mm. "Diameter" as used herein refers to the average largest cross-sectional dimension. Where the truss has a substantially constant diameter, the average diameter can be in the range of 0.03 to 5.0, preferably 0.05 to 4.0. Where the truss has a continuously varying diameter, the truss can vary within this range, for example from 0.03 to 1.0 mm, from 1.0 to 1.7 mm, from 1.7 to 2.4 mm, and so on.

Figure 5:
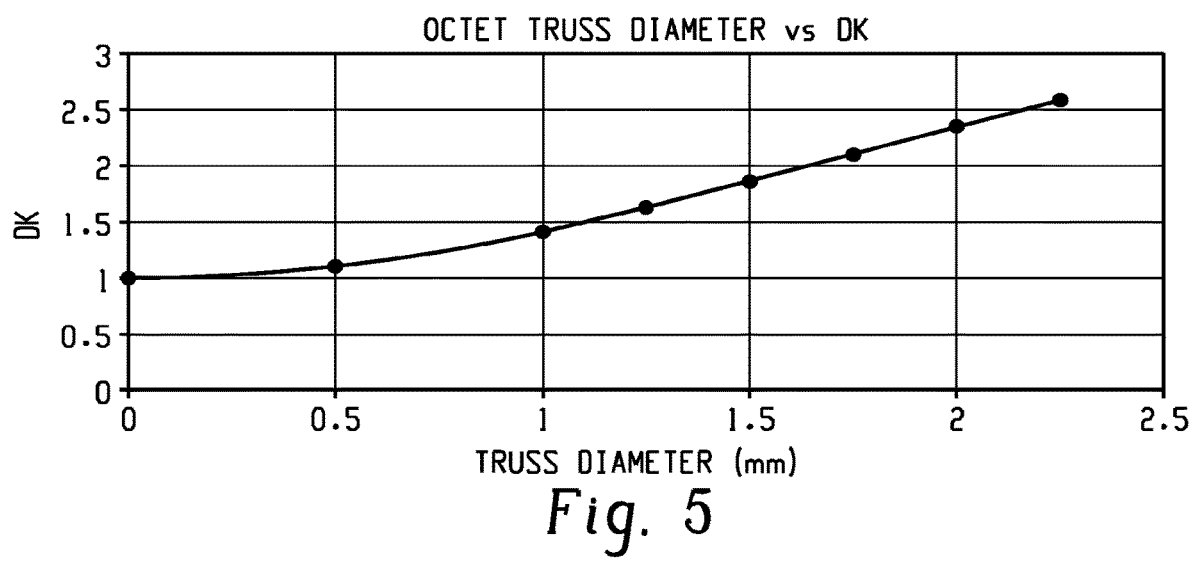
FIG. 5 is a graph showing Dk versus truss diameter for an octet unit cell.
Figure 6A:
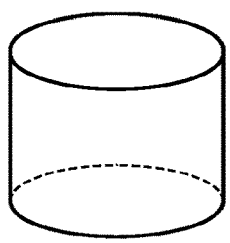
FIG. 6A to FIG. 6J are schematic representations of shapes of the polymer structure of exemplary embodiments.
Figure 6B:
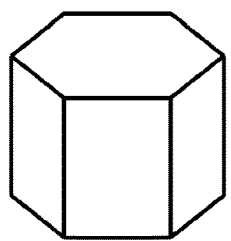
Figure 6C:
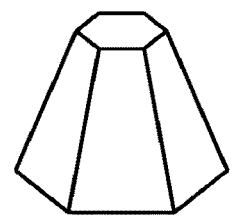
Figure 6D:
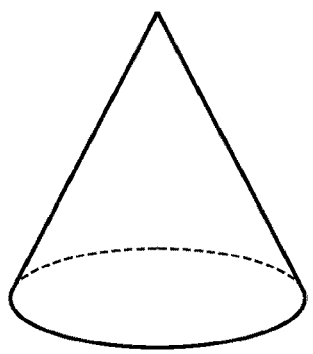
Figure 6E:
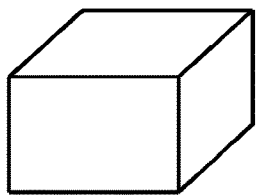
Figure 6F:
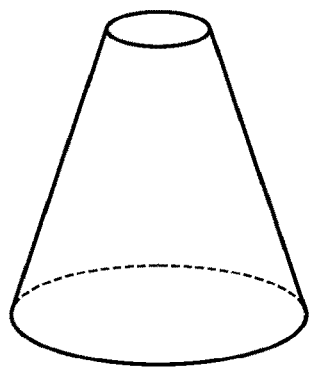
Figure 6G:
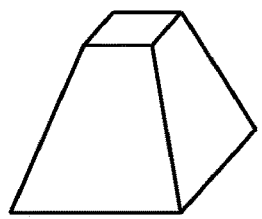
Figure 6H:
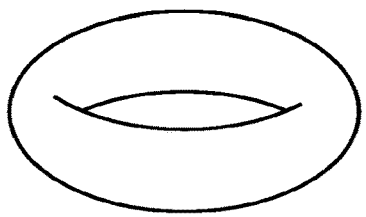
Figure 6I:
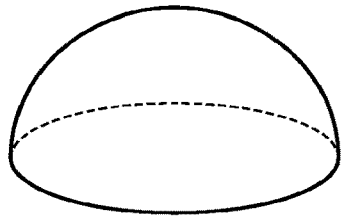
Figure 6J:
Figure 7A:
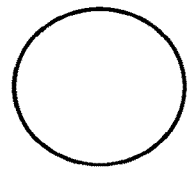
FIG. 7A to FIG. 7E are schematic cross-sectional views of polymer shapes of exemplary embodiments.
Figure 7B:
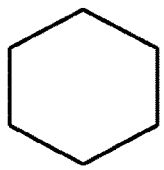
Figure 7C:
Figure 7D:
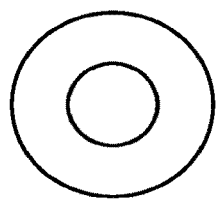
Figure 7E:

The unit cells can be of any lattice configuration, for example cubic (FIG. 1A) and its variations, e.g., body-center cubic or face center cubic, or octet (FIG. 2A). Use of an octet lattice unit cell is preferred, as it allows thinner truss diameters and lengths that can be more easily scaled to higher frequencies. Octet lattice units are also advantageous because they can have an isotropic dielectric constant within the unit, such that a given electromagnetic wave can interact with the unit in the same way regardless of its orientation. A simulation predicting dielectric constant (Dk) versus truss diameter in millimeters is shown in FIG. 5.

Each of the unit cells can have size less than 30%, or less than 20%, or less than 10% of a wavelength of an electromagnetic wave that the polymer structure is designed to operate with. The wavelength of the electromagnetic wave is limited primarily by manufacturing capabilities, and therefore can vary widely. In an aspect the frequency range of operation is 1 to 100 GHz, i.e., a wavelength of 3 to 300 mm. The smallest cell size (e.g., 1 mm) can presently be limited by current manufacturing capabilities.

Figure 2B:
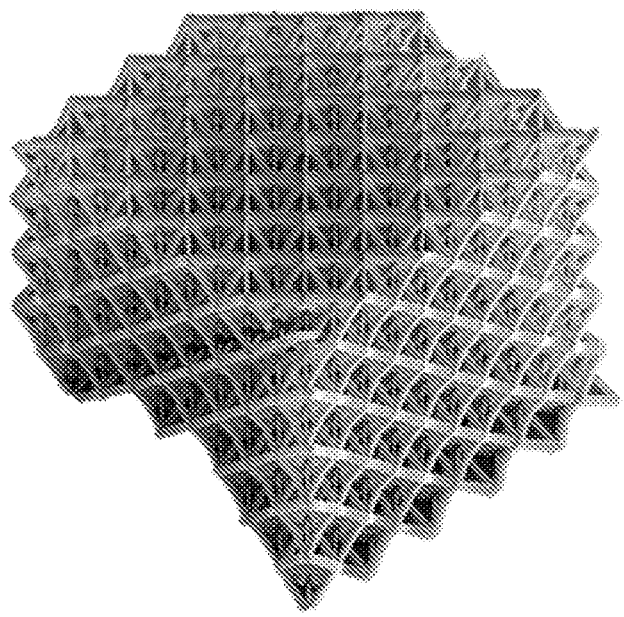
FIG. 2B is a schematic, perspective view of a polymer structure containing a plurality of octet lattice unit cells as shown in FIG. 2A.

As shown in FIGS. 1B and 2B, the polymer structure is a unified, three-dimensional body that includes a plurality of unit cells wherein each cell is adjacent to another cell. In an aspect each unit cell is integrally connected with an adjacent one of the unit cells. For example, polymer structure 20 in FIG. 1B includes eight unit cells 10. While the polymer structures of FIGS. 1B and 2B are shown as a cube and an irregular shape, respectively, any shape can be used. With reference now to FIGS. 6A-6J, any dielectric structure 20 disclosed herein can have a three-dimensional form in the shape of a cylinder (FIG. 6A), a polygon box (FIG. 6B) a tapered polygon box (FIG. 6C), a cone (FIG. 6D), a cube (FIG. 6E), a truncated cone (FIG. 6F), a square pyramid (FIG. 6G), a toroid (FIG. 6H), a dome (FIG. 6I), an elongated dome (FIG. 6J), or any other three-dimensional form suitable for a purpose disclosed herein. Referring now to FIGS. 7A-7E, such shapes can have a z-axis cross section in the shape of a circle FIG. 7A), a polygon (FIG. 7B), a rectangle (FIG. 7C), a ring (FIG. 7D), an ellipsoid (FIG. 7E), or any other shape suitable for a purpose disclosed herein. In addition, the shape can depend on the polymer used, the desired dielectric gradient, the selected type of unit cell, and the desired mechanical and electrical properties.

The dielectric gradient in the polymer structure is established by varying the density of each unit cell, more commonly the density of a selected set of unit cells. The density can be varied by including more material in each unit cell, where more material provides a higher dielectric constant and less material provides a lower dielectric constant. For example, as disclosed in Liang et al., referenced above, each set of unit cells in a layer can contain additional polymer deposited at the joint of the unit cell.

Figure 8:
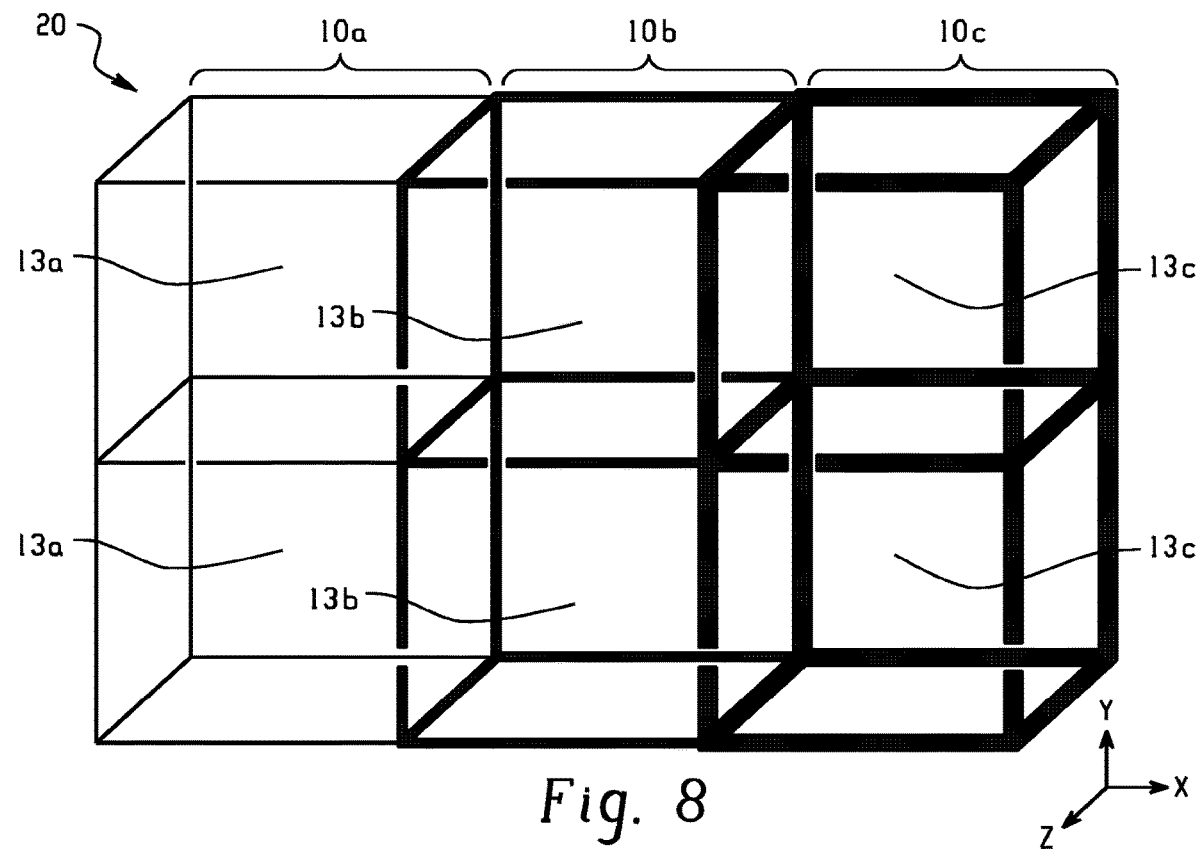
FIG. 8 is a schematic, perspective view of a polymer structure having a step gradient dielectric constant increasing in the X-direction due to increasing truss diameter in the X-direction.

In a preferred aspect, the density of the polymer structure is varied by varying the diameter of each truss in a selected set of unit cells. Referring to FIG. 8, polymer structure 20 includes three sets of unit cells in the X-direction, 10a, 10b, and 10c. The diameter of each truss of each of set of unit cells 10a, 10b, and 10c increases in thickness in the X-direction, decreasing the size of the interstices 13a, 13b, 13c in each of unit cells 10a, 10b, and 10c respectively. When the interstices are filled with air, a step gradient of dielectric constants from lower (set 10a) to higher (set 10c) is provided.

Figure 9:
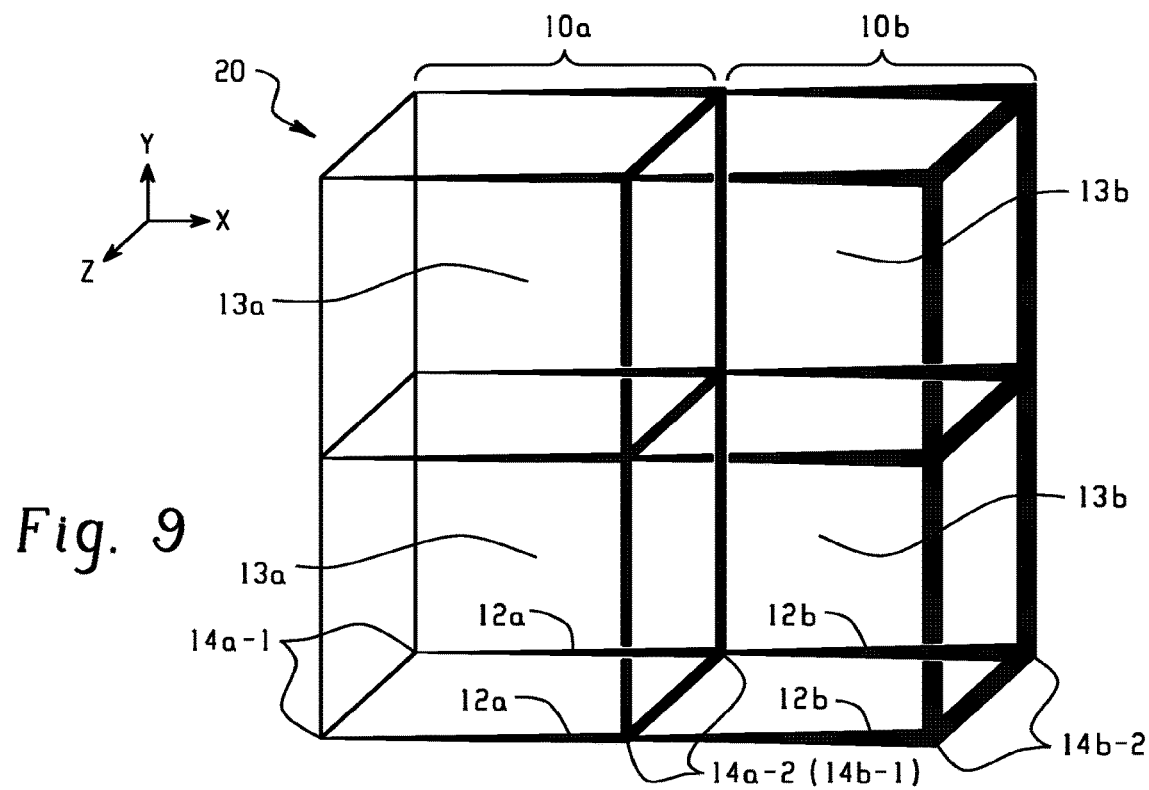
FIG. 9 is a schematic, perspective view of a polymer structure having a continuous gradient dielectric constant increasing in the X-direction due to increasing truss diameter in the X-direction.

In another aspect, the diameter of each truss of a unit cell can vary within a set of cells to provide a continuous gradient. As shown for example, in FIG. 9, trusses 12a along the X-direction (the horizontal trusses) of set 10a increase in diameter from end 14a-1 to end 14a-2, until joined with trusses 12b of unit cell set 10b. Ends 14a-2 have the same diameter as ends 14b-1 of trusses 12b. Trusses 12b (again, the horizontal trusses) further increase in diameter from ends 14b-1 to ends 14b-2. The Y- and Z-direction trusses joined at ends 14a-1 have the same diameter as ends 14-a-1. The Y- and Z-direction trusses common to set 10a and set 10b have the same diameter as ends 14a-2/14b-1. The Y- and Z-direction trusses joined at ends 14b-2 have the same diameter as ends 14b-2. This configuration provides a continuous dielectric gradient increasing along the X- and Y-axis of polymer structure 20. The dielectric gradient along the Z-axis is constant.

Figure 10A:
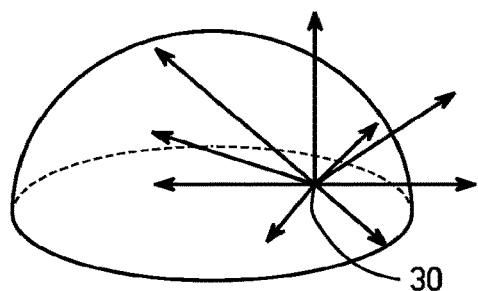
FIG. 10A to FIG. 10F are schematic representations of dielectric gradients of the polymer structures of exemplary embodiments.

The direction of the dielectric gradient can accordingly be varied in the polymer structure by varying the diameter of the trusses in the unit cells accordingly as shown in FIGS. 10A-10F. For example, the dielectric constant can vary in three dimensions from a common point as shown in FIG. 10A, where the arrows indicate a continuous, uniform decrease in dielectric constant in three dimensions from a centerpoint 30 of a hemisphere toward the edges of the hemisphere.

Figure 10B:
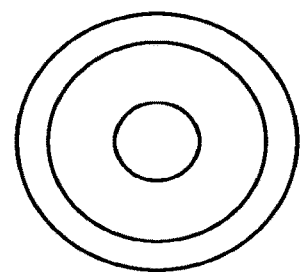

FIG. 10B shows a cross-sectional view of a cylinder divided longitudinally into three sections, an inner section, an intermediate section, and an outer section. The inner section has a first dielectric constant, the intermediate section has a second dielectric constant, and the outer section has a third dielectric constant, providing a radial, step gradient dielectric constant. In an aspect, the first dielectric constant can be lower than the second dielectric constant, which can be lower than the third dielectric constant. Alternatively, in another aspect, the first dielectric constant can be higher than the second dielectric constant, which can be higher than the third dielectric constant. In still another aspect, the first dielectric constant can be higher than the second dielectric constant, and the third dielectric constant can be higher than the first and second dielectric constants.

Figure 10C:
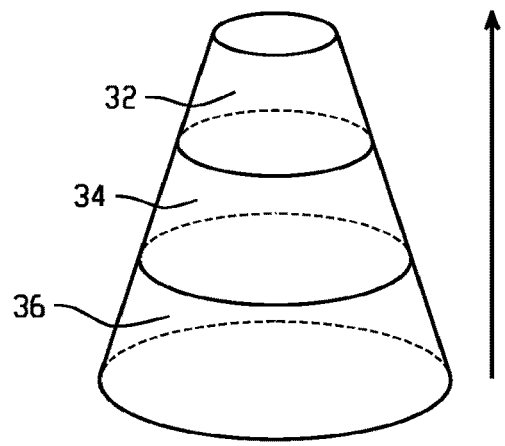

FIG. 10C shows a frustoconical shape divided horizontally into sections 32, 34, and 36, where the arrow indicates a decrease in dielectric constant from section 32 to 34 to 36. As shown in another aspect in FIG. 10D, sections 42 and 46 can have the same first dielectric constant, and sections 44 and 48 can have the same second dielectric constant, wherein either of the first and second dielectric constants are higher or lower than the other, providing a periodic step gradient.

Figure 10D:
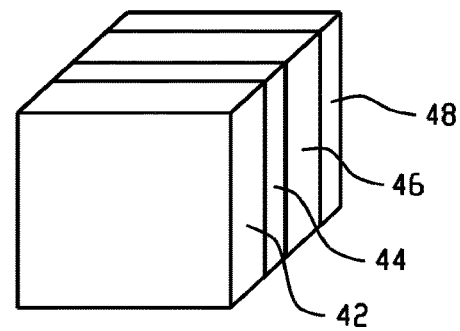

FIG. 10D shows a cubic polymer structure shape divided into sections 42, 44, 46, and 48. Sections 42, 46 can have the same first dielectric constant and sections 44, 48 can have the same second dielectric constant. The first dielectric constant can be greater than or less than the second dielectric constant, which can establish a periodic dielectric constant gradient. It is also possible for the gradient to have other variations. For example, the gradient can vary randomly or pseudo-randomly from one point of the structure to another.

Figure 10E:
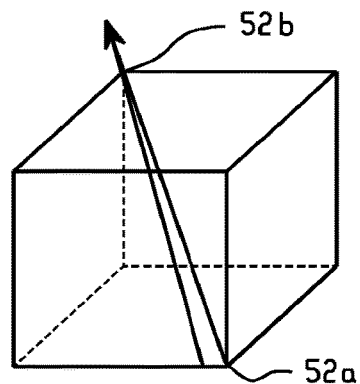
Figure 10F:
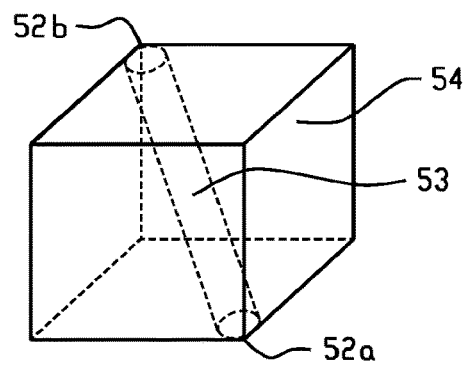

In another aspect, FIG. 10E shows a cubic polymer structure shape having a first vertex 52a and a second vertex 52b. The dielectric constant can vary continuously throughout the shape from first vertex 52a to second vertex 52b. In still another aspect, FIG. 10F shows a cubic polymer structure shape having a first vertex 52a and a second vertex 52b. A first section 53, shown in the shape of a cylinder is located spanning first vertex 52a to second vertex 52b. Second section 54 surrounds first section 53. First section 53 can have a first dielectric constant and second section 54 can have a second dielectric constant, where the first and second dielectric constants differ. It is also possible for the dielectric constant of each section to vary independently. For example, first section 53 can have a dielectric constant that increases in a step gradient from vertex 52a to vertex 52b, while section 54 can have a single dielectric constant.

In some aspects, the interstitial spaces of each unit cell (e.g., 13c in FIGS. 8 and 13b in FIG. 9) are filled with air. In other aspects, the interstitial spaces can be filled by a dielectric material. Such filling can be conducted by impregnation of the polymer structure after it is manufactured. The dielectric material filler can have a lower dielectric constant than the material used to form at least some of the trusses. For example, in some aspects the dielectric filler can have a very low dielectric constant (e.g., polytetrafluoroethylene (PTFE)) and be present to further support the trusses of the polymer structure. This allows manufacture of very thin trusses or can provide stiffening to more flexible trusses. In other aspects, the polymer structure can be formed using a low dielectric constant material, and then filled with a higher dielectric constant material. This technique can be useful to provide polymers structures having an overall higher dielectric constant gradient.

As is clear to those of skill in the art from the above discussion, a direction of the dielectric gradient can be varied in any direction by varying the diameter of a set of trusses in the desired direction. Different shapes of gradients can be manufactured, or even different shapes of gradients within a single polymer structure. A combination of step gradients and continuous gradients can be present, for example a first section having a step gradient adjacent to a second portion having a continuous gradient. The particular gradient or combination of gradients used can be selected based on the end purpose of the polymer structure.

These complex features can be readily obtained by use of SLA methods, which allow ready manufacture of the desired gradient in any direction and in any shape within the polymer structure. The magnitude of the gradient, i.e., the range, can vary widely, depending on the type of unit cells, the diameters of the trusses, and the materials used. For example, the range of the dielectric constant can be from greater than 1 (i.e., greater than the dielectric constant of air) to 20, each measured at 10 GHZ, 50% relative humidity, and 23° C. Any gradient of dielectric constants within this range can be obtained, for example from 1.1 to 10, or from 1.1 to 5, or 1.1 to 3 across the polymer structure, each measured at 10 GHz, 50% relative humidity, and 23° C. Alternatively, the dielectric constant gradient can be from 5 to 20, or from 5.1 to 18, or from 5.1 to 15, or from 5.5 to 11, or from 6 to 10 across the polymer structure, each measured at 10 GHz, 50% relative humidity, and 23° C.

Specific SLA methods are described, for example, in WO2014/126837. SLA methods further allow the use of a wide variety of radiation-curable resins to form the polymer structures. The particular radiation-curable resin compositions are selected based on their suitability for use in SLA methods (i.e., can be provided in liquid form), and to provide the desired mechanical and electrical properties to the polymer structures. The liquid resin composition for forming the polymer structures can include a radiation-curable, i.e., a photocurable and/or free radical curable monomer component and a photoinitiator component. "Monomer" as used herein is inclusive of photocurable compounds, oligomers, prepolymers, and polymers. "Curable" and "curing" includes polymerizable and crosslinkable, and polymerizing and curing. Suitable monomers include radiation-curable groups such as acryl ($CH_2$=CHCOO—), methacryl ($CH_2$=C($CH_3$)COO), acrylamide ($CH_2$=CHCONH—, methacrylamide ($CH_2$=C($CH_3$)CONH), vinyl ($CH_2$=CH—), allyl ($CH_2$=CH—$CH_2$—), other alkenes such as unsaturated aromatic compounds (e.g., styrenics), cyclic alkenes, alkynes, carbon monoxide, or a combination thereof. For convenience, "radiation-curable groups" includes groups curable in the presence of an initiator that can be photoactivated, such as a cationic photoinitiator. Such groups include epoxy, vinyl ether, heterocyclic groups such as lactones, lactams, and cyclic amines, and other groups. The monomer can be linear, branched, cyclic, or crosslinked, and can have one or more functional groups, for example one or more acryl groups (e.g., a trifunctional acrylate monomer) or one or more vinyl groups (e.g., a divinyl ether). Examples of liquid monomers and initiators include but are not limited to those set forth in WO2016/153711, U.S. Pat. Nos. 8,232,043, 8,119,214, 7,935,476, 7,767,728, 7,649,029, WO2012/129968, CN102715751, and JP 2012210408A.

Exemplary monomers and multifunctional monomers include a radiation-curable silicone, a urethane acrylate, a urethane methacrylate, a ($C_{1-6}$ alkyl) acrylate, a ($C_{1-6}$ alkyl) methacrylate such as methyl methacrylate, a urethane dimethacrylate, 1,3-glycerol dimethacrylate, 1,6-hexanediol diacrylate, 1,6-hexanediol dimethacrylate, 1,4-butanediol diacrylate, 1,4-butanediol dimethacrylate, methylene glycol dimethacrylate, diethylene glycol divinyl ether, methylene glycol divinyl ether, 1,4-cylcohexane dimethylol divinyl ether, dipropylene glycol divinyl ether, tripropylene glycol divinyl ether, 1,6-hexanediol divinyl ether, and 1,4-butanediol divinyl ether, methoxyethene, 4-methoxystyrene, styrene, 2-methylprop-1-ene, 1,3-butadiene, oxirane, thietane, tetrahydrofuran, oxazoline, 1,3,-dioxepane, and oxetan-2-one.

The photoinitiator component includes one or more photoinitiators. For example, the photoinitiator component can include one or more free radical photoinitiators or one or more cationic photoinitiators. Photoinitiators known in the art for use in compositions for SLA methods can be used. Exemplary free radical photoinitiators include a compound that produces a free radical on exposure to radiation such as ultraviolet and/or visible radiation, in an amount sufficient to initiate a polymerization reaction. The free-radical photoinitiator can be a single compound, a mixture of two or more active compounds, or a combination of two or more different compounds (such as co-initiators).

Exemplary cationic photoinitiators include compounds that form aprotic acids or Bronsted acids upon exposure to radiation such as ultraviolet and/or visible radiation, in an amount sufficient to initiate polymerization. The cationic photoinitiator used can be a single compound, a mixture of two or more active compounds, or a combination of two or more different compounds (such as co-initiators). Examples of cationic photoinitiators include onium salts, sulfonium salts, and iodonium salts, such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, and triphenylsulfonium triflate, dibutylnaphthylsulfonium triflate, as described in U.S. Pat. Nos. 7,824,839, 7,550,246, 7,534,844, and in "Photoacid Generator Selection Guide for the electronics industry and energy curable coatings" (BASF 2010). The cationic photoinitiator can be used in conjunction with a photosensitizer, e.g. 9,10-diethoxyanthracene, to enable the cationic photoinitiator to be activated over a broader range of wavelengths.

The radiation-curable resin composition can have additional components solubilized therein, including thermally curable resin components, thermal cure initiators, pigments, dyes, flame retardants, antioxidants, plasticizers, polymerization inhibitors, and the like, depending on the purpose of the polymer structure being fabricated.

In some aspect the radiation-curable resin composition further comprises a thermally curable resin component and thermal cure initiator component to initiate thermal cure. Inclusion of a thermally curable resin component allows multi-stage curing of the polymer structure. Radiation-curable compositions including a thermally curable resin component and a thermal cure initiator component are described, for example, in WO2017/040883. Examples of monomers that can be used as thermally curable resin components include 1,3-dicyanatobenzene, 1,4-dicyanatobenzene, 1,3,5-tricyanatobenzene, 1,3-dicyanatonaphthalene, 1,3,6-tricyanatoaphthalene, 2,2'-dicyanatobiphenyl, bis(4-cyanathophenyl) methane, 4-chloro-1,3-dicyanatobenzene, cyanated novolacs produced by reacting a novolac with cyanogen halide, and cyanated bisphenol polycarbonate oligomers produced by reacting a bisphenol polycarbonate oligomer with cyanogen halide. Examples of thermal cure initiators include peroxides, certain nucleophilic catalysts, or certain metal catalysts as is known in the art.

The relative amounts of each component of the radiation-curable resin composition can be, for example, 10 to 95 weight percent (wt %) of the radiation-curable monomer component, 0.11 to 15 wt % of the photoinitiator component, 0 to 90 wt % of the thermally curable resin component, and 0 to 10 wt % of the thermal cure initiator component, each based on the total weight of the composition.

A general method for SLA manufacture of a polymer structure having a spatially gradient dielectric constant generally includes providing a volume of the above-described liquid, radiation-curable composition; irradiating a portion of the liquid, radiation-curable composition with activating radiation in a pattern to form a layer of the polymer structure on a substrate; contacting the formed layer with the liquid, radiation-curable composition; irradiating a portion of the liquid, radiation-curable composition with activating radiation in a pattern to form a next layer of the polymer structure; and repeating the contacting and the irradiating to form the polymer structure, wherein the polymer structure comprises a plurality of unit cells, wherein each unit cell is defined by a plurality of trusses formed by the irradiation, and the trusses of each unit cell are dimensioned to provide the spatially gradient dielectric constant. In a preferred aspect, the method is a stereolithography method as described, for example, in U.S. Pat. No. 9,205,601.

After the polymer material is manufactured, the 3D-printed polymer material can optionally be post-cured, e.g., further photopolymerized. If a thermosetting resin composition is included in the radiation-curable composition, the post-cure can be thermal, for example by exposure to heat in an oven. Such dual radiation cure and thermal cure is described, for example, in WO2017/040. Both a radiation and a thermal post-cure can be used.

In an aspect, the polymer material is contacted with an electrically conductive layer. In some aspects, at least two alternating polymer structures or at least two alternating layers of the electrically conductive layer are present to form a stack. Useful electrically conductive materials for the conductive layer include, for example, stainless steel, copper, gold, silver, aluminum, zinc, tin, lead, a transition metal, or a combination thereof. There are no particular limitations regarding the thickness of the conductive layer, nor are there any limitations as to the shape, size, or texture of the surface of the electrically conductive layer. The conductive layer can have a thickness of 1 to 2000 micrometers, or 10 to 1000 micrometers. When two or more conductive layers are present, the thickness of each layer can be the same or different. The conductive layer can comprise a copper layer. Suitable conductive layers include a thin layer of a conductive metal such as a copper foil presently used in the formation of circuits, for example, electrodeposited copper foils.

The conductive layer can be contacted with the polymer structure by placing the conductive layer on the platform used for the additive manufacturing process, and printing onto the conductive layer. Alternatively, the polymer material can be contacted with the conductive layer by direct laser structuring, or by adhesion. Other methods known in the art can be used to apply the conductive layer where permitted by the particular materials and form of the polymer materials, for example, electrodeposition, chemical vapor deposition, and the like.

For example, the conductive layer can be applied by laser direct structuring. Here, the 3D-printed polymer material can comprise a laser direct structuring additive, and the laser direct structuring can comprise using a laser to irradiate the surface of the substrate, forming a track of the laser direct structuring additive, and applying a conductive metal to the track. The laser direct structuring additive can comprise a metal oxide particle (such as titanium oxide and copper chromium oxide). The laser direct structuring additive can comprise a spinel-based inorganic metal oxide particle, such as spinel copper. The metal oxide particle can be coated, for example, with a composition comprising tin and antimony (for example, 50 to 99 wt % of tin and 1 to 50 wt % of antimony, based on the total weight of the coating). The laser direct structuring additive can comprise 2 to 20 parts of the additive based on 100 parts of the respective composition. The irradiating can be performed with a YAG laser having a wavelength of 1,064 nanometers under an output power of 10 Watts, a frequency of 80 kilohertz (kHz), and a rate of 3 meters per second. The conductive metal can be applied using a plating process in an electroless plating bath comprising, for example, copper.

The conductive layer can be adhesively contacted. In an aspect, the polymer structure can first be formed by photopolymerization. When a thermal cure agent is present in the polymer material composition, the polymer structure and the electrically conductive layer can be contacted and adhered by thermal cure of the polymer material in the polymer structure. This technique allows "B-staging" of the polymer structures. It is particularly useful where multilayer structures are desired. For example, a plurality of layers of the polymer structures can be manufactured (B-staged); a stack of alternating polymer layers and conductive layers can be made; and then the stack can be thermally cured to adhere the layers. In other aspects, a polymer structure can be manufactured (B-staged) in the form of a flat sheet; a conductive layer can be contacted with the flat sheet; the layers can be rolled to provide a cylinder of alternating polymer sheet and conductive layer; and the roll can be thermally cured to adhere the layers.

Alternatively, or in addition, an adhesion layer can be disposed between one or more conductive layers and the polymer material.

The polymer structures can be used as or in an electronic device, for example as an impedance-matching layer, a dielectric waveguide, a lens, a reflect array, an antenna matching structure, a superstrate, a coupler, a divider, and a dielectric antenna (including dielectric resonant antennas and dielectric rod antennas).

Figure 11:
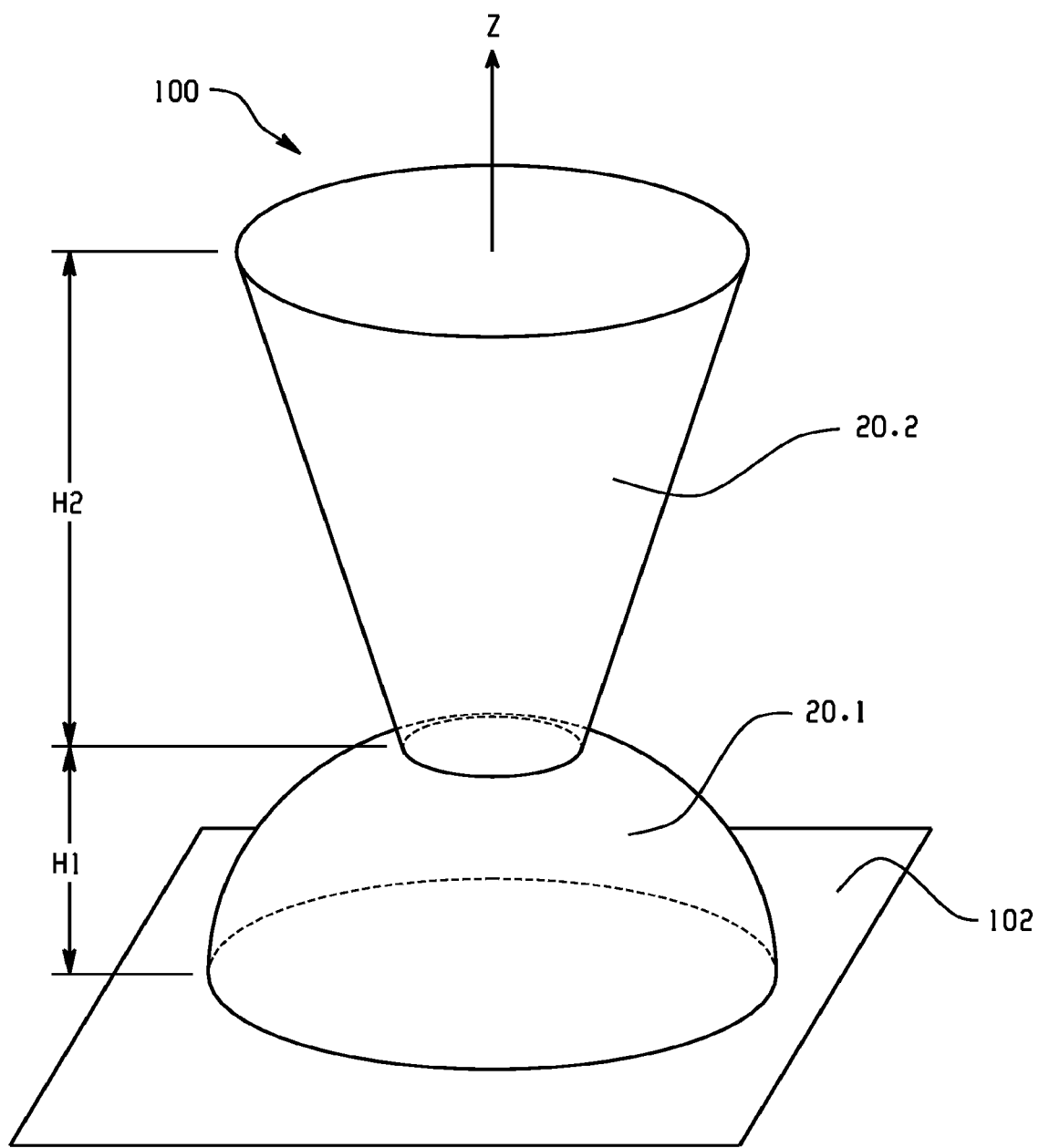
FIG. 11 depicts an electronic structure or device, in particular an electromagnetic structure or device, in accordance with an embodiment.

As disclosed herein and with reference to all of the foregoing, and with particular reference to FIG. 11, an electronic structure or device 100, in particular an electromagnetic (EM) structure or device, can comprise a first dielectric portion (1DP) 20.1, of any dielectric structure 20 disclosed herein, in the form of a dielectric resonator antenna (DRA), for example, and a second dielectric portion (2DP) 20.2, of any dielectric structure 20 disclosed herein, in the form of a dielectric lens, such as a Luneburg lens for example, or any other dielectric element that forms an electromagnetic (EM) far field beam shaper, for example; or, a dielectric waveguide, or any other dielectric element that forms an EM near field radiation conduit, for example. As disclosed herein, and as will be appreciated by one skilled in the art, the 1DP and the 2DP are distinguishable over each other in that the 1DP is structurally configured and adapted to have an EM resonant mode that coincides with an EM frequency of an electrical signal source that is electromagnetically coupled to the 1DP, and the 2DP is structurally configured and adapted to: in the case of a dielectric EM far field beam shaper, serve to affect the EM far field radiation pattern originating from the 1DP when excited without itself having a resonant mode that matches the EM frequency of the electrical signal source; or, in the case of a dielectric EM near field radiation conduit, serve to propagate the EM near field emission originating from the 1DP when excited with little or no EM signal loss along the length of the 2DP. As disclosed herein, the phrase electromagnetically coupled is a term of art that refers to an intentional transfer of EM energy from one location to another without necessarily involving physical contact between the two locations, and in reference to an embodiment disclosed herein more particularly refers to an interaction between an electrical signal source having an EM frequency that coincides with an EM resonant mode of the associated 1DP and/or 1DP combined with 2DP. In an embodiment, the electromagnetically coupled arrangement is selected such that greater than 50% of the resonant mode EM energy in the near field is present within the 1DP for a selected operating free space wavelength associated with the EM device. In some embodiments, the height H2 of the 2DP is greater than the height H1 of the 1DP (e.g., the height of the 2DP is greater than 1.5 times the height of the 1DP, or the height of the 2DP is greater than 2 times the height of the 1DP, or the height of the 2DP is greater than 3 times the height of the 1DP). In some embodiments, the average dielectric constant of the 2DP is less than the average dielectric constant of the 1DP (e.g., the average dielectric constant of the 2DP is less than 0.5 the average dielectric constant of the 1DP, or the average dielectric constant of the 2DP is less than 0.4 the average dielectric constant of the 1DP, or the average dielectric constant of the 2DP is less than 0.3 the average dielectric constant of the 1DP). In some embodiments, the 2DP has axial symmetry around a specified axis (the z-axis depicted in FIG. 11 for example). In some embodiments, the 2DP has axial symmetry around an axis that is normal to an electrical ground plane surface 102 on which the 1DP is disposed.

As stated above, the methods described herein allow fast, efficient manufacture of materials having a preselected dielectric constant gradient, in a variety of configurations and a variety of shapes, with a variety of compositions. The methods have many other advantages, including dramatically reducing the time from design to prototyping to commercial product. Since no tooling is needed, design changes can be made quickly. Minimal energy is used, compared to injection molding or other molding processes. Use of additive manufacturing can also decrease the amount of waste and raw materials. The method can further be used to facilitate production of geometrically complex parts. The method can further reduce the parts inventory for a business since parts can be quickly made on-demand and on-site.

Set forth below are various non-limiting aspects of the disclosure.

Aspect 1: A stereolithography method of manufacture of a polymer structure having a spatially gradient dielectric constant, the method comprising: providing a volume of a liquid, radiation-curable composition; irradiating a portion of the liquid, radiation-curable composition with activating radiation in a pattern to form a layer of the polymer structure; contacting the layer with the liquid, radiation-curable composition; irradiating the liquid, radiation-curable composition with activating radiation in a pattern to form a second layer on the first layer; and repeating the contacting and irradiating to form the polymer structure, wherein the polymer structure comprises a plurality of unit cells wherein each unit cell is integrally connected with an adjacent unit cell, each unit cell is defined by a plurality of trusses formed by the irradiation, wherein the trusses are integrally connected with each other at their respective ends, and the trusses of each unit cell are dimensioned to provide the spatially gradient dielectric constant.

Aspect 2: The method of aspect 1 wherein the unit cell structure is an octet structure.

Aspect 3a: The method of any one or more of the preceding claims, wherein each of the unit cells can have size less than 30%, or less than 20%, or less than 10% of a wavelength of an electromagnetic wave in which the polymer structure is operable.

Aspect 3b: The method of any one or more of the preceding aspects, wherein the polymer structure is operable within a wavelength of an electromagnetic wave in the range from 3 to 300 millimeters.

Aspect 4: The method of any one or more of the preceding aspects, wherein each truss has an average diameter in the range of 0.03 to 5.0 millimeter, preferably 0.05 to 4.0 millimeter.

Aspect 5: The method of any one or more of the preceding aspects, wherein the dielectric constant gradient is a step gradient.

Aspect 6: The method of any one or more of the preceding aspects, wherein the dielectric gradient is a continuous gradient.

Aspect 7: The method of any one or more of the preceding aspects, wherein the dielectric gradient has endpoints in a range from 20 to greater than 1, measured at 10 GHz, 23° C., and 50% relative humidity.

Aspect 8: The method of any one or more of the preceding aspects, further comprising impregnating the polymer structure with a dielectric material.

Aspect 9: The method of any one or more of the preceding aspects, wherein the liquid, radiation-curable composition comprises a thermally curable component, and the method further comprises thermally curing the polymer structure.

Aspect 10: The method of aspect 9, comprising contacting the polymer structure with an electrically conductive substrate and thermally curing the polymer structure.

Aspect 11: The method of aspect 9, further comprising contacting at least two alternating layers of the polymer structure or at least two layers of the electrically conductive substrate to form a stack, and thermally curing the polymer structure in the stack.

Aspect 12: The polymer structure having a spatially gradient dielectric constant formed by any of the preceding aspects.

Aspect 13: An electronic device comprising the polymer structure of aspect 12, wherein the device is an impedance-matching layer, a dielectric waveguide, a lens, a reflect array, an antenna matching structure, a superstrate, a coupler, a divider, or a dielectric antenna.

Aspect 14: An electronic device, comprising a polymer structure, wherein the polymer structure comprises: a unified body of dielectric material comprising a plurality of unit cells, each unit cell comprising a plurality of trusses integrally connected with each other at their respective ends, wherein each unit cell is integrally connected with an adjacent one of the unit cells; wherein the average dielectric constant of the unified body of dielectric material varies from a portion of the body to another portion of the body.

Aspect 15: The electronic device of Aspect 13, wherein the plurality of trusses is integrally connected with each other only at their respective ends Aspect 16: The electronic device of any one or more of Aspects 14 to 15 wherein each unit cell of the plurality of unit cells has an octet lattice structure.

Aspect 17: The electronic device of any one or more of Aspects 14 to 16, wherein each unit cell of the plurality of unit cells comprises interstitial spaces between the plurality of trusses.

Aspect 18: The electronic device of Aspect 17, wherein the interstitial spaces comprise air.

Aspect 19: The electronic device of Aspect 18, wherein the interstitial spaces comprise a dielectric material other than air.

Aspect 20: The electronic device of any one or more of Aspects 14 to 19, wherein the average dielectric constant of the unified body of dielectric material decreases in a direction from an internal portion of the body to an outer portion of the body.

Aspect 21: The electronic device of any one or more of Aspects 14 to 19, wherein the average dielectric constant of the unified body of dielectric material varies periodically from a first portion of the body to a second portion of the body.

Aspect 22: The electronic device of any one or more of Aspects 14 to 21, wherein the plurality of trusses of a given unit cell have a constant cross-sectional dimension.

Aspect 23: The electronic device of any one or more of Aspects 14 to 21, wherein the plurality of trusses of a given unit cell have a non-constant cross-sectional dimension.

Aspect 24: The electronic device of any one or more of Aspects 14 to 22, wherein the cross-sectional dimension is a circular cross-sectional dimension.

Aspect 25: The electronic device of Aspects 22 to 24, wherein the non-constant cross-sectional dimension decreases in a direction from an internal portion of the body to an outer portion of the body.

Aspect 26: The electronic device of any one or more of Aspects 14 to 25, wherein each truss of the plurality of trusses has an overall maximum cross-sectional dimension in the range of 0.03 to 5.0 millimeters.

Aspect 27: The electronic device of any one or more of Aspects 14 to 26, wherein the spatially gradient dielectric constant of the unified body of dielectric material is from 20 to greater than 1, measured at 10 GHz, 23° C., and 50% relative humidity.

Aspect 28: The electronic device of any one or more of Aspects 14 to 27, further comprising at least one electrical conductor disposed in contact with the unified body of dielectric material.

Aspect 29: The electronic device of Aspect 28 wherein the at least one electrical conductor is adhered to the unified body of dielectric material via an adhesive material.

Aspect 30: The electronic device of any one or more of Aspects 14 to 29, wherein the unified body of dielectric material forms at least part of an impedance-matching layer, a dielectric waveguide, a lens, a reflect array, an antenna matching structure, a superstrate, a coupler, a divider, or a dielectric antenna.

Aspect 31: The electronic device of Aspect 30, wherein the unified body of dielectric material is a first dielectric portion, 1DP, of the electronic device, and further comprising a second dielectric portion, 2DP, wherein: the 1DP has a proximal end and a distal end; the 2DP has a proximal end and a distal end; and the proximal end of the 2DP is disposed proximate the distal end of the 1DP.

Aspect 32: The electronic device of Aspect 31, further comprising an electrical ground plane surface upon which the 1DP is disposed.

Aspect 33: The electronic device of any one or more of Aspects 31 to 33, wherein a height H2 of the 2DP is greater than a height H1 of the 1DP.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named. Similarly, "a combination thereof" is open, and can include at least one of the named elements, optionally together with a like or equivalent element not named.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, and the like.

When an element such as a layer, film, region, or substrate is referred to "contacting" or as being "on" another element, it can be directly contacting or directly on the other element or intervening elements can also be present. In contrast, when an element is referred to as "directly contacting" or as being "directly on" another element, there are no intervening elements present. Although the terms first, second, third etc. may be used herein to describe various elements, components, regions, layers, or sections, these elements, components, regions, layers, or sections should not be limited by these terms. These terms are only used to distinguish one element, component, aspect, region, layer, or section from another element, component, region, layer, or section. Thus, a first element, component, region, layer, or section discussed below could be termed a second element, component, region, layer, or section without departing from the teachings of the present aspects.

Exemplary aspects are described herein with reference to cross section illustrations that are schematic illustrations. As such, variations from the shapes of the illustrations as a result, for example, of manufacturing techniques and/or tolerances, are to be expected. Thus, aspects described herein should not be construed as limited to the particular shapes or relative sizes of regions as illustrated herein but are to include deviations in shapes that result, for example, from manufacturing or design. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape or relative size of a region and are not intended to limit the scope of the present claims Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A stereolithography method of manufacture of a polymer structure having a spatially gradient dielectric constant, the method comprising:
    providing a volume of a liquid, radiation-curable composition;
    irradiating a portion of the liquid, radiation-curable composition with activating radiation in a pattern to form a layer of the polymer structure;
    contacting the layer with the liquid, radiation-curable composition;
    irradiating the liquid, radiation-curable composition with activating radiation in a pattern to form a second layer on the first layer; and
    repeating the contacting and irradiating to form the polymer structure,
    wherein the polymer structure comprises an open-lattice cell structure comprising a plurality of unit cells wherein each unit cell is integrally connected with an adjacent unit cell,
    wherein density of the polymer structure is varied to provide the spatially gradient dielectric constant, and
    wherein the spatially gradient dielectric constant has endpoints in a range from 20 to greater than 1, measured at 10 GHz, 23° C., and 50% relative humidity.

2. The method of claim 1, wherein the gradient is a step gradient.

3. The method of claim 1, wherein the gradient is a continuous gradient, a random gradient, or a pseudo-random gradient.

4. The method of claim 1, wherein the spatially gradient dielectric constant has endpoints in a range from 10 to greater than 1, measured at 10 GHz, 23° C., and 50% relative humidity.

5. The method of claim 1, wherein the spatially gradient dielectric constant has endpoints in a range from 5 to greater than 1, measured at 10 GHz, 23° C., and 50% relative humidity.

6. The method of claim 1, further comprising impregnating the polymer structure with a dielectric material other than air.

7. The method of claim 1, wherein the liquid, radiation-curable composition comprises a thermally curable component, and the method further comprises thermally curing the polymer structure.

8. The method of claim 7, comprising contacting the polymer structure with an electrically conductive substrate and thermally curing the polymer structure.

9. The method of claim 7, further comprising contacting at least two alternating layers of the polymer structure or at least two layers of the electrically conductive substrate to form a stack, and thermally curing the polymer structure in the stack.

10. The method of claim 1, wherein in the polymer structure, an average dielectric constant of the polymer structure decreases in a direction from an internal portion of the polymer structure to an outer portion of the polymer structure.

11. The method of claim 10, wherein the average dielectric constant of the polymer structure varies periodically from a first portion of the body to a second portion of the body.

12. The method of claim 1, wherein an average dielectric constant of the polymer structure varies periodically from a first portion of the body to a second portion of the body.

13. The method of claim 1, wherein at least one electrical conductor is disposed in contact with the polymer structure.

14. A stereolithography method of manufacture of a polymer structure having a spatially gradient dielectric constant, the method comprising:
    providing a volume of a liquid, radiation-curable and thermally-curable composition;
    irradiating a portion of the liquid, radiation-curable and thermally curable composition with activating radiation in a pattern to form a layer of the polymer structure;
    contacting the layer with the liquid, radiation-curable and thermally curable composition;
    irradiating the liquid, radiation-curable composition with activating radiation in a pattern to form a second layer on the first layer; and
    repeating the contacting and irradiating to form the polymer structure; and
    thermally curing the polymer structure;
    wherein the polymer structure comprises an open-lattice cell structure comprising a plurality of unit cells wherein each unit cell is integrally connected with an adjacent unit cell,
    wherein density of the polymer structure is varied to provide the spatially gradient dielectric constant, and wherein the spatially gradient dielectric constant has endpoints in a range from 10 to greater than 1, measured at 10 GHz, 23° C., and 50% relative humidity.

15. The method of claim 14, further comprising contacting the polymer structure with an electrically conductive substrate, followed by thermally curing the polymer structure.

16. The method of claim 14, wherein the dielectric gradient has endpoints in a range from 5 to greater than 1, measured at 10 GHz, 23° C., and 50% relative humidity.

17. A stereolithography method of manufacture of a polymer structure having a spatially gradient dielectric constant, the method comprising:
 providing a volume of a liquid, radiation-curable composition;
 irradiating a portion of the liquid, radiation-curable composition with activating radiation in a pattern to form a layer of the polymer structure;
 contacting the layer with the liquid, radiation-curable composition;
 irradiating the liquid, radiation-curable composition with activating radiation in a pattern to form a second layer on the first layer; and
 repeating the contacting and irradiating to form the polymer structure,
 wherein the polymer structure comprises an open-lattice cell structure comprising a plurality of unit cells wherein each unit cell is integrally connected with an adjacent unit cell,
 each unit cell has size of less than 30% of a wavelength of an electromagnetic wave in which the polymer structure is operable,
 wherein density of the polymer structure is varied to provide the spatially gradient dielectric constant, and
 wherein the spatially gradient dielectric constant of the polymer structure has endpoints in a range from 10 to greater than 1, measured at 10 GHz, 23° C., and 50% relative humidity.

18. The method of claim 17, wherein the dielectric gradient has endpoints in a range from 5 to greater than 1, measured at 10 GHZ, 23° C., and 50% relative humidity.

* * * * *